(12) United States Patent
Wong et al.

(10) Patent No.: US 9,667,630 B2
(45) Date of Patent: May 30, 2017

(54) AUTHENTICATING A BROWSER-LESS DATA STREAMING DEVICE TO A NETWORK WITH AN EXTERNAL BROWSER

(71) Applicant: Roku, Inc., Saratoga, CA (US)

(72) Inventors: Allen Tsz-Chiu Wong, San Jose, CA (US); Bharath Bhoopalam, San Jose, CA (US)

(73) Assignee: ROKU, INC., Saratoga, CA (US)

( * ) Notice: Subject to any disclaimer, the term of this patent is extended or adjusted under 35 U.S.C. 154(b) by 0 days.

(21) Appl. No.: 15/280,091

(22) Filed: Sep. 29, 2016

(65) Prior Publication Data

US 2017/0019404 A1    Jan. 19, 2017

Related U.S. Application Data

(63) Continuation of application No. 14/668,528, filed on Mar. 25, 2015, now Pat. No. 9,473,940.

(60) Provisional application No. 62/118,928, filed on Feb. 20, 2015.

(51) Int. Cl.
| | |
|---|---|
| *H04L 29/06* | (2006.01) |
| *H04W 12/06* | (2009.01) |
| *H04W 12/08* | (2009.01) |
| *H04L 29/08* | (2006.01) |
| *H04W 4/00* | (2009.01) |

(52) U.S. Cl.
CPC .......... *H04L 63/0876* (2013.01); *H04L 63/10* (2013.01); *H04L 65/1069* (2013.01); *H04L 65/4084* (2013.01); *H04L 65/60* (2013.01); *H04L 67/02* (2013.01); *H04W 12/06* (2013.01); *H04W 12/08* (2013.01); *H04W 4/008* (2013.01)

(58) Field of Classification Search
CPC ....... H04L 63/00; H04L 63/08; H04L 63/083; H04L 63/0846; H04L 63/0853; H04L 63/0876; H04L 63/0884; H04L 63/10; H04L 63/102; H04L 63/108; H04L 63/12; H04L 63/18; H04W 12/06; H04W 12/08
See application file for complete search history.

(56) References Cited

U.S. PATENT DOCUMENTS

| | | | |
|---|---|---|---|
| 6,618,398 B1 * | 9/2003 | Marchetti | H04B 7/18582 370/401 |
| 8,224,988 B2 * | 7/2012 | Kubota | H04L 29/06 709/220 |
| 8,752,161 B1 * | 6/2014 | Thai | H04L 65/105 370/389 |
| 8,893,255 B1 * | 11/2014 | Martini | H04L 63/0884 709/238 |
| 2003/0229780 A1 * | 12/2003 | Reamer | H04L 63/0407 713/153 |

(Continued)

*Primary Examiner* — Eric W Shepperd
(74) *Attorney, Agent, or Firm* — Sterne, Kessler, Goldstein & Fox P.L.L.C.

(57) ABSTRACT

A system, method and computer readable device are described herein. A plurality of packets are received at a data streaming device, from a computing device; the packets including authentication information for gaining access to a local network. The MAC address of the computing device with a MAC address of a data streaming device in the header of the packets. The authentication information including the MAC address of the data streaming device to a server. An authentication to access the local network is received from the server.

19 Claims, 7 Drawing Sheets

(56) References Cited

U.S. PATENT DOCUMENTS

| | | | |
|---|---|---|---|
| 2007/0076709 A1* | 4/2007 | Mattson | H04L 12/4641 370/389 |
| 2007/0226779 A1* | 9/2007 | Yokomitsu | H04L 9/0869 726/2 |
| 2010/0293603 A1* | 11/2010 | Zhang | H04L 63/08 726/4 |
| 2011/0283344 A1* | 11/2011 | Krishnan | H04L 63/08 726/5 |
| 2013/0137402 A1* | 5/2013 | Ergen | H04W 12/04 455/411 |
| 2014/0266779 A1* | 9/2014 | Grothaus | G08C 17/02 340/870.02 |

* cited by examiner

AUTHENTICATING A BROWSER-LESS DATA STREAMING DEVICE TO A NETWORK WITH AN EXTERNAL BROWSER

CROSS REFERENCE TO OTHER APPLICATIONS

This application is a continuation of U.S. patent application Ser. No. 14/056,454 filed on Oct. 17, 2013, which is hereby incorporated by reference in its entirety.

FIELD

The field relates generally to data streaming devices, and more specifically to connecting the data streaming devices without a browser to a network using a browser of another computing device.

BACKGROUND

When a data streaming device is configured to access a wireless network, the data streaming device streams data. However, when the data streaming device attempts to access another wireless network, an entity that owns or controls that wireless network may first require authentication of the data streaming device.

BRIEF SUMMARY

System, method, and computer readable device embodiments, and combinations and sub-combinations thereof, for enabling a data streaming device without a browser to provide authentication information to a server that authenticates the data streaming device are disclosed. In an embodiment, the data streaming device establishes a connection to a computing device that includes a browser. Next, the data streaming device uses the browser of the computing device to provide authentication information to a server. The server uses the authentication information to determine whether the data streaming deice has access to a network. Successful authentication enables the data streaming device to stream content over the network.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for authenticating a browser-less data streaming device to a network with a browser of another computing device.

When a data streaming device is configured to access a wireless network, the data streaming device streams content. However, when a data streaming device is portable, the data streaming device may attempt to access another wireless network, such as but not limited to a network at a hotel or other organization. An entity that owns, controls, and/or manages the other wireless network may first require authentication of the data streaming device. In an embodiment, the data streaming device authentication may be implemented using a browser that is loaded and executed on the data streaming device. The browser may transmit authentication information to an entity that controls the wireless network access. Example authentication information may include payment, user credentials, acceptance of terms and conditions for network usage, viewing an advertisement, answering a questionnaire, etc. Once the entity authenticates the data streaming device, the data streaming device can connect to the network and stream content.

However, using a browser on a data streaming device has several deficiencies. For example, a browser is an evolving software application and requires constant software updates, because, for example, the HyperText Markup Language ("HTML") standard improves and changes. Additionally, a browser that executes on the data streaming device utilizes resources, including processor and memory that may otherwise be used to stream content.

Example embodiments for addressing the above deficiencies are described below.

Figure 1A:
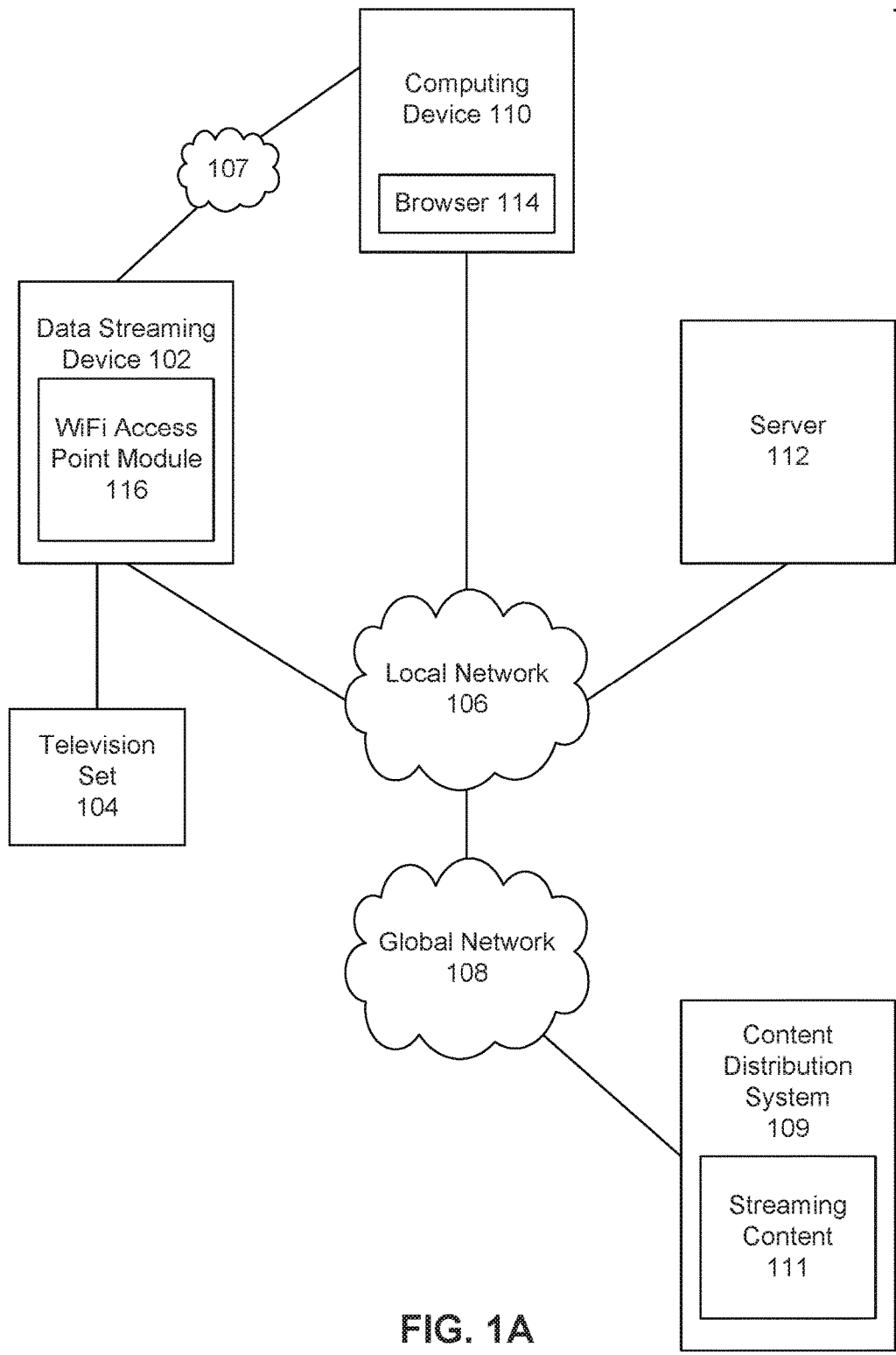
FIGS. 1A-1C are block diagrams of systems that include a data streaming device, according to various embodiments.

FIG. 1A is a block diagram 100A of a system where example embodiments may be implemented.

In an embodiment, block diagram 100 includes a data streaming device 102. Data streaming device 102 may be a computing device that provides streaming content, such as, video, audio, multimedia, etc., content, over a network, such as the Internet, to a television set 104. Example data streaming device 102 may be a streaming stick or a streaming player. Video content may include movies, television episodes, commercials, video games, on-demand video content, and Internet content, to name a few examples.

In an embodiment, data streaming device 102 connects to a television set 104 or another device that includes a display screen, using for example an HDMI (High-Definition Multimedia Interface), composite cables or other connecting means. HDMI is a proprietary audio/video interface for transferring uncompressed video data and also for transferring compressed and/or uncompressed audio data between HDMI compliant devices.

In an embodiment, data streaming device 102 may be a portable device that may be transported to different locations and be connected to television set 104 or another device that displays streaming content at one of these different locations. For example, data streaming device 102 may be carried from a home of a user to a hotel when a user travels and be connected to a television set at the hotel to stream content.

In an embodiment, data streaming device 102 and television set 104 may be combined into a single device (not shown).

In an embodiment, to obtain streaming content over a network, data streaming device 102 may utilize one or more local and global networks, such as a local network 106 and a global network 108. In an embodiment, local network 106 may be a Wi-Fi or WiFi network, or a wireless local area network ("WLAN") that connects to global network 108. In another embodiment, local network 106 may be connected to global network 108 via an Ethernet cable or other wireless means such as Bluetooth®. In an embodiment, data streaming device 102 connects to local network 106 to access general network 108. Further, a person skilled in the art will appreciate that these connectivity examples are exemplary and that other wired and wireless connection types to connect to networks 106 and 108 may be used.

In an embodiment, global network 108 may be a global system of interconnected computer networks, such as the Internet, that connects billions computing devices worldwide. These computing devices may also be part of private, public, academic, business, and government networks and include an extensive amounts of information and resources, and may be sources of streaming content that data streaming device 102 can stream to television set 104.

In an embodiment, content distribution system 109 may store and distribute streaming content, such as streaming content 111. Content distribution system 109 may be database storage or another non-volatile storage discussed, for example, in detail in FIG. 5, and that stores data for one or more computing devices connected to global network 108. Content distribution system 109 is adapted to store large amounts of data from multiple sources and in combination with one or more web servers or other servers adapted for selecting and distributing streaming content 111 over global network 108.

In an embodiment, data streaming device 102 along with numerous other computing devices 110 may use local network 106 to connect and obtain data from global network 108. Non-limiting example computing devices 110 may include personal computers, laptop computers, smartphones, video-game consoles, tablet computers, digital cameras, and digital audio players.

In a further embodiment, data streaming device 102 may also communicate with computing device 110 via a network 107. Network 107 may be a wireless network or a wired network.

In a further embodiment, local network 106 may be under ownership and/or control of and/or managed by an entity different from a user of data streaming device 102. This entity may control access of data streaming device 102 and computing device 110 to local network 106. For example, an entity may be a hotel that may own and/or operate local network 106 and allows data streaming devices 102 and computing devices 110 of customers of the hotel to access local network 106. In an embodiment, an entity may allow free access, paid access and/or access subject to the terms and condition, for data streaming devices 110 to local network 106. In another embodiment, the entity may also categorize different customers for free or paid access to local network 106. Other example entities that may own local network 106 may include a café, a school, a university, a hospital, a business, etc.

In an embodiment, data streaming device 102 may connect to local network 106 wirelessly, using an Ethernet, or another way that is known to a person skilled in the relevant art.

In an embodiment, an entity may use a web server or another server, referred to as server 112 to determine which devices, including data streaming device 102 and computing device 110 can access local network 106. Server 112 is a computing device or application that executes on one or more computing devices that authenticates data streaming device 102 and computing device 110 for access to local network 106. In an embodiment, server 112 under control of a hotel may require a room number, a customer's name, and a predetermined fee, if any, to authenticate data streaming device 102 and computing device 110, before granting access to these devices to local network 106. In another example, server 112 may require a user of data streaming device 102 and computing device 110 to agree to the terms and conditions before granting access to these devices to local network 106. Once server 112 authenticates data streaming device 102 or computing device 110, data streaming device 102 or computing device 110 may use local network 106 to access global network 108, including Internet to obtain and stream content.

In an embodiment, computing device 110 may include a web browser 114 or simply browser 114. Browser 114 is a software application for retrieving, displaying and transmitting information and resources between computing device 110 and server 112, as well as other devices in global network 108. A resource may be a web page, an image, a video or other type of content that may be stored or accessed by browser 114 using a Uniform Resource Identifier (URI) or a Unified Resource Locator (URL).

In an embodiment, computing device 110 may use browser 114 for authentication to local network 106. For example, browser 114 that executes on computing device 110 may transmit an authentication request to server 112, where the authentication request requests access to global network 108 through local network 106. In response to the access request, server 112 transmits a response message that includes a URI and which causes browser 114 to display the resource on computing device 110. The resource may be a web page that includes information required to authenticate computing device 110. The information that is required for authentication is referred to as authentication information.

In an embodiment, an authentication process may be instituted when data streaming device 102 detects a captive portal. For example, browser 114 may issue a Hypertext Transfer Protocol ("HTTP") or Domain Name System ("DNS") query that attempts to access a resource in global network 108. When server 112 receives an access request from browser 114, server 112 may redirect the query to an authentication page stored on server 112 and send a response message to browser 114 that includes the authentication page with authentication information required by server 112. Browser 114 then displays the authentication page that requires authentication information on computing device 110. When computing device 110 receives the requested authentication information, which may include a room number, payment information or name of the user of computing device 110, to give a few examples, browser 114 transmits the authentication information to server 112. Server 112 authenticates the authentication information and, if authentication is successful, server 112 grants computing device 110 access to global network 108. In an embodiment, server 112 grants access to computing device 110 by terminating the captive portal and stopping the redirects of HTTP/DNS queries to the authentication page or allowing computing device 110 to receive requested information from global network 108. If authentication is unsuccessful, server 112 continues to transmit the authentication request to browser 114.

In an embodiment, server 112 tracks an authenticated computing device 110 and/or data streaming device 102. For example, server 112 stores a unique media access control address (MAC address) of the authenticated devices until the authenticated time period, if any, expires, and the devices require another authentication. Typically, each computing device 110 and data streaming device 102 have a unique MAC address.

In an embodiment, when data streaming device 102 does not include browser 114, data streaming device 102 may use browser 114 of computing device 110 to obtain authentication information. Alternatively, data streaming device 102 may also use other devices for authentication that are known to a person skilled in the art, including near field communication ("NFC") devices, Bluetooth® devices, and radio frequency identification ("RFID") devices, to name a few examples, to receive the authentication information. Once authenticated, data streaming device 102 may obtain access to local network 106 and global network 108.

For example, a customer in a hotel may connect data streaming device 102 to the hotel's television set and then use computing device 110 to authenticate data streaming device 102 to the hotel's local network. Upon a successful authentication, a customer may use global network 108 to obtain streaming content 111 and display the streaming content 111 on the hotel's television set.

In an embodiment, there may be several reasons against including a browser on data streaming device 102. For example, a browser may require software updates or upgrades as HTML standards continue to evolve, extra memory storage for storing a browser within data streaming device 102 and additional processing power for execution.

In an embodiment, prior to using browser 114 for authentication, data streaming device 102 may determine whether data streaming device 102 can access content, such as a web page, stored in global network 108. If data streaming device 102 can access the content, then data streaming device 102 does not require authentication using browser 114. In an embodiment data streaming device 102 may use a default URI or URL to access content stored within global network 108, such as "abc123.com/networktest". The default URI or URL stores content that is expected by data streaming device 102. For example, if data streaming device 102 receives an expected response, such as an "Internet UP!" message, then data streaming device 102 assumes that it can access global network 108. On the other hand, if in response to a request for a default URI or URL, data streaming device 102 receives a response that includes a HTTP redirect to a different web page or receives a web page or message having unexpected content, that is content other than "Internet UP!", data streaming device 102 then determines that authentication with server 112 may be required before data streaming device 102 may access content using global network 108.

In an embodiment, when data streaming device 102 requires authentication, data streaming device 102 uses browser 114 of computing device 110. To access browser 114, data streaming device 102 initiates WiFi access point capability, which causes data streaming device to dynamically switch from being a WiFi end-point device to a WiFi access point device. A person skilled in the art will appreciate that a WiFi end-point device does not establish connections with other computing devices to connect to a network, but can send and receive data over the network. A person skilled in the art will also appreciate that a wireless access point on a device allows wireless devices to connect to a network using WiFi or another standard. For example, data streaming device 102 activates WiFi access point module 116 that causes data streaming device 102 to act as a wireless access point for other computing devices 110, in addition to being an end point device. In an embodiment, WiFi access point module 116 activates a P2P WiFi interface, IP routing, Dynamic Host Configuration Protocol ("DHCP") server, and network address translation ("NAT") that allows computing device 110 to connect to data streaming device 102. Additionally, data streaming device 102 may also display a message, either using television set 104 or browser 114 of computing device 110 for a user to authenticate data streaming device 102. In an embodiment, the message may be included in a dialog box.

In an embodiment, computing device 110 may connect to data streaming device 102 using a service set identifier ("SSID") and a security key. In an embodiment, SSID identifies a particular WiFi access point (data streaming device 102) and security key authenticates a device (computing device 102) to the WiFi access point. Once data streaming device 102 authenticates computing device 110, data streaming device 102 may use browser 114 to receive the authentication information to authenticate data streaming device 102 to an entity, such as a hotel, café, etc., that controls local network 106 via server 112.

In an embodiment, to be authenticated to local network 106, computing device 110 acts as an intermediary between data streaming device 102 and server 112. For example, browser 114 of computing device 110 displays a web page that requests authentication information required by server 112. As discussed above, authentication information may include a password, a name, a payment request and/or an acceptance of terms and conditions for using local network 106. In an embodiment, the browser may receive authentication information entered by a user through the one of input devices coupled to computing device 110, and that is discussed, for example, in FIG. 6. In another embodiment, the browser may retrieve the authentication information from a file stored in a memory storage of computing device 110. When browser 114 receives the required authentication information entered using computing device 110, browser 114 causes computing device 110 to transmit the authentication information to data streaming device 102. In an embodiment, the authentication information may be transmitted as one or more packets. To track the packets that include the authentication information, computing device 110 also transmits the MAC address and IP address of computing device 110 in one or more packets.

In an embodiment, when data streaming device 102 receives packets from computing device 110, data streaming device 102 removes the MAC address and IP address of computing device 110 from the packets and replaces the MAC address and IP address of computing device 110 with the MAC address and IP address of data streaming device 102. Once replaced, data streaming device 102 transmits the packets with the MAC address and IP address of data streaming device 102 to server 112.

In an embodiment, when server 112 receives packets, including the authentication information from data streaming device 102, server 112 authenticates the data streaming device 102. For example, server 112 determines whether the username corresponds to a password, whether user's name and room number corresponds to a guest staying at a hotel that controls access to local network 106, whether the payment information included in the authentication information is valid and whether server 112 is able to use the payment information to obtain payment for accessing local network 106, or whether the authentication information includes information that a user agreed to the terms and conditions required to obtain access to local network 106. Once authenticated, server 112 transmits packets that include status of the authentication (for example, on whether authentication was successful or unsuccessful), the MAC address and IP address of data streaming device 102 back to data streaming device 102.

In an embodiment, once data streaming device 102 receives packets from server 112, data streaming device 102 replaces the MAC address and IP address in the packets with the MAC address and IP address of computing device 110. Data streaming device 102 then transmits the packets to computing device 110.

In an embodiment, once computing device 110 receives the packets from data streaming device 102, browser 114 of computing device 110 retrieves authentication information in the packets and displays to a user whether authentication with server 112 was successful. This way, a user using computing device 110 is able to visually determine whether data streaming device 102 was able to obtain access to local network 106. Upon successful authentication, data streaming device 102 may use local network 106 to connect to global network 108 to access and stream content. If authentication was unsuccessful, computing device 110 may display another request to a user to enter authentication information. In another embodiment, computing device 110 may decrypt the authentication status prior to displaying the status.

In a further embodiment, data streaming device 102 may also store authentication information that data streaming device 102 received from computing device 110. For example, computing device 110 may transmit unencrypted authentication information that data streaming device 102 may store in a memory storage within or accessible to data streaming device 102. Example memory storage is discussed in detail in FIG. 5. This way, data streaming device 102 may retransmit authentication information to server 112 in the event server 112 requires another authentication. In an embodiment, data streaming device 102 waits until authentication is successful before storing authentication information.

In an embodiment, once server 112 authenticates data streaming device 102, data streaming device 102 deactivates WiFi access point module 116 which causes data streaming device 102 to disconnect from computing device 110. After the deactivation, data streaming device 102 serves as an end point device that requests and receives streaming content 111 from global network 108.

In an embodiment, when data streaming device 102 is connected to global network 108, data streaming device 102 may continuously query the default URI or URL discussed above. When data streaming device 102 can no longer access the default URL, data streaming device 102 may re-authenticate itself with server 112. In one embodiment, to re-authenticate itself with server 102, data streaming device 102 may retrieve authentication information stored in a memory accessible to data streaming device 102 and resubmit the authentication information to server 112 for authentication. In another embodiment, to re-authenticate itself with server 112, data streaming device 102 activates WiFi access point module 116 to access computing device 110 and uses browser 114 of computing device 110 to receive and transmit authentication information.

Figure 1B:
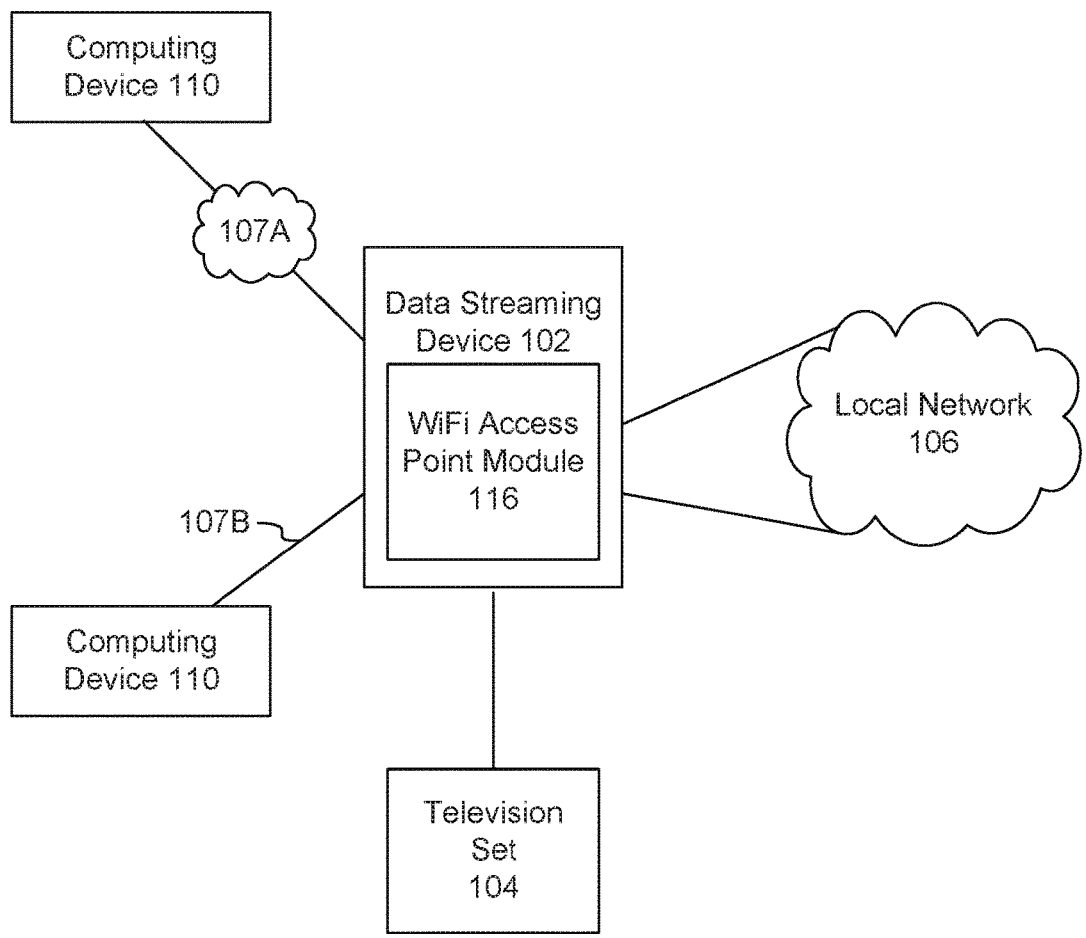

FIG. 1B is a block diagram 100B of a system including a data streaming device, according to an embodiment. As discussed above, data streaming device 102 communicates with computing device 110 via a network 107, such as networks 107A and/or 107B. Network 107A is a wireless network that allows data streaming device 102 to wirelessly connect to computing device 110 using WiFi Access Point Module 116. In an embodiment, network 107A may also be implemented using wireless standards other than WiFi. In another embodiment, network 107A may use Bluetooth® tethering to connect data streaming device 102 and computing device 110.

In another embodiment, network 107B allows data streaming device 102 to connect to computing device 110 using a cable, that allows information to be communicated between data streaming device 102 and computing device 110. Example cables may include a Universal Serial Bus ("USB") cable or High-Definition Multimedia Interface ("HDMI").

Figure 1C:
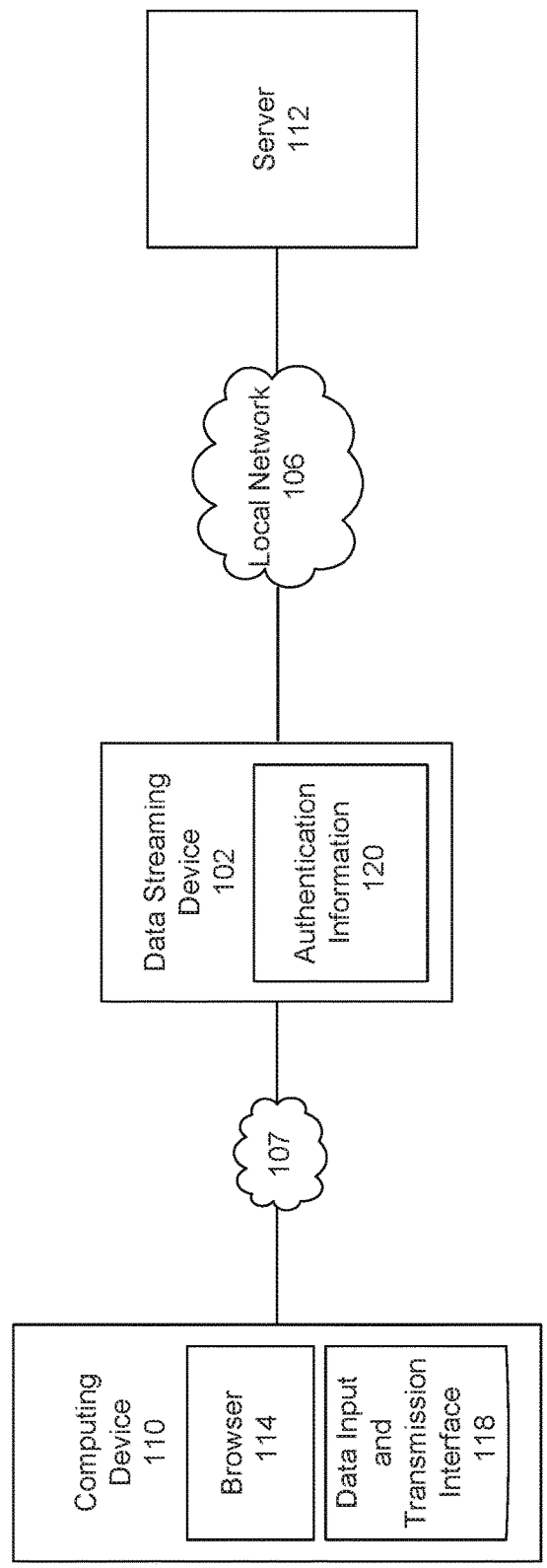

FIG. 1C is a block diagram 100C of a system that includes a data streaming device, according to an embodiment.

In an embodiment, when data streaming device 102 does not include browser 114, data streaming device 102 may use browser 114 of computing device 110 for authentication, as described above. In addition or instead of browser 114, computing device 110 may use other applications and/or software, or a combination of applications and/or software, collectively referred to as data input and transmission interface 118, to receive authentication information on behalf of data streaming device 102, retrieve authentication information from one or more memory storages discussed in FIG. 5 coupled to computing device 110 and transmit the authentication information to data streaming device 102.

In another embodiment, as part of data input and transmission interface 118, data streaming device 102 and computing device 110 may be enabled with NFC or Bluetooth® technology. NFC or Bluetooth® technology allows data streaming device 102 and computing device 110 to pass authentication information to each other using radio signals and do not require wireless network 107A.

As discussed above, data streaming device 102 authenticates the authentication information with server 112 over local network 106. When data streaming device 102 receives authentication information from computing device 110 or from the memory storage within data streaming device 102 (not shown), data streaming device 102 formats the authentication information in packets. Data streaming device 102 then includes MAC address and IP address information in the packets, such that server 112 receives the packets with MAC address and IP address of data streaming device 110, and not of computing device 110. Because server 112 does not detect the MAC address and IP address of computing device 110 though data streaming device 102, computing device 110 may be able to directly connect to server 112.

In an embodiment, once data streaming device 102 receives packets from server 112, data streaming device 102 replaces the MAC address and IP address in the packets with the MAC address and IP address of computing device 110 before propagating the packets to computing device 110. Data streaming device 102 then transmits the packets to computing device 110.

In an embodiment, data streaming device 102 may also store authentication information as authentication information 120. Data streaming device 102 may store authentication information 120 within memory storage included in data streaming device 102 or coupled to data streaming device 102. Once authentication information 120 is stored in the memory storage in or accessible to data steaming device 102, data streaming device 102 may use authentication information 120 to reconnect with local network 106 when data streaming device 102 loses access to global network 108, and without connecting to computing device 110 to obtain the authentication information.

In a further embodiment, data streaming device 102 stores authentication information 120 after server 112 grants access to data streaming device 102 to local network 106, and ensures that authentication information 120 is valid information.

In a further embodiment, authentication information 120 may be encrypted or non-encrypted information. For example, when authentication information 120 is encrypted, data streaming device 120 may store authentication information 120 without decrypting the authentication information, and propagate authentication information 120 to server 112 as needed.

Figure 2:
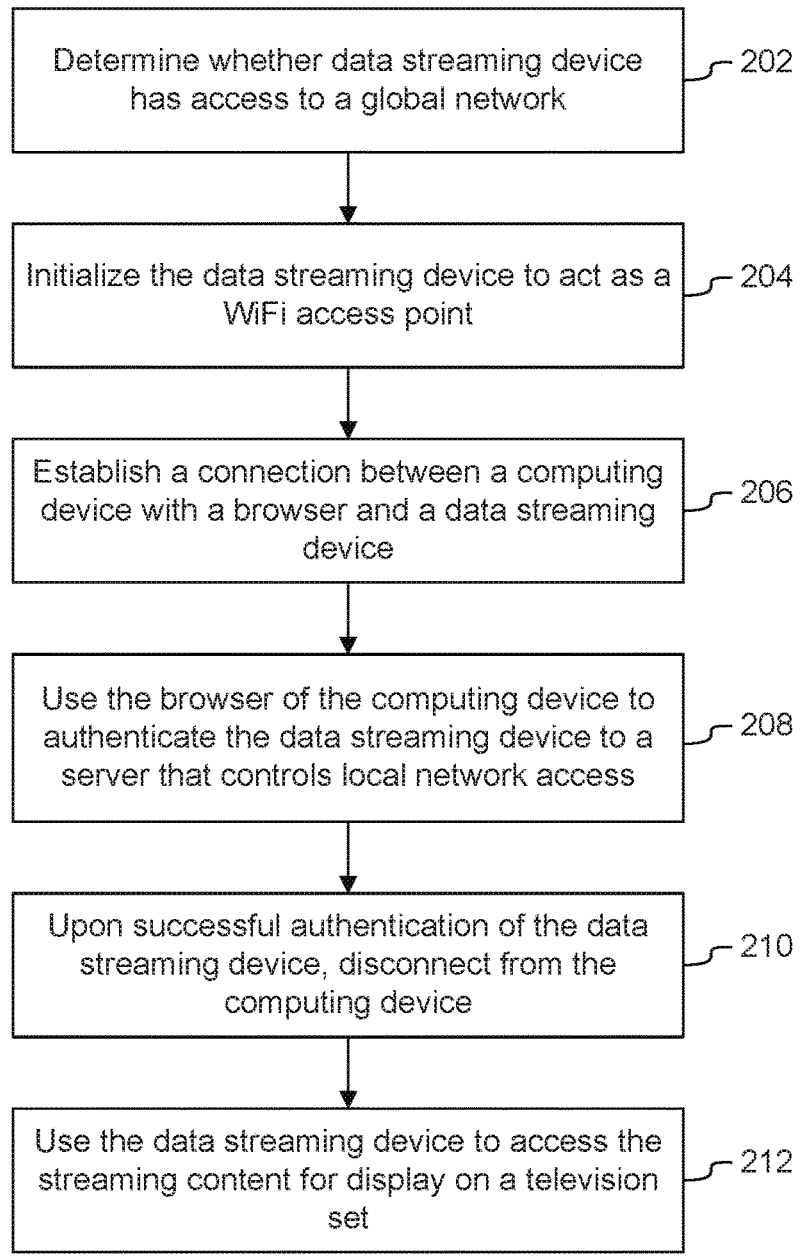
FIG. 2 is a flowchart of a method for connecting a data streaming device to a network, according to an embodiment.

FIG. 2 is a flowchart of a method 200 for authenticating a data streaming device to a server, according to an embodiment.

At operation 202, a determination is made whether data streaming device has access to a global network. For example, data streaming device 102 queries a default resource, such as a default web page, stored in global network 108. If in response to the query, data streaming device 102 receives the resource with expected content, data streaming device 102 determines that it has access to global network 108 and the flowchart ends. In an embodiment, when data streaming device 102 has access to global network 108, data streaming device 102 may repeat operation 202 at preconfigured time intervals to ensure that data streaming device 102 maintains network access. If data streaming device 102 receives a response to a query with unexpected content or is rerouted to another URI, data streaming device 102 determines that there is no access to global network 108 and proceeds to operation 204.

At operation 204, a WiFi access point is initialized. For example, data streaming device 102 activates WiFi access point module 116 and becomes a WiFi access point for computing devices 110, in addition to being an end point device. As discussed above, WiFi access point module 116 activates P2P WiFi interface, IP routing, DHCP server and NAT.

At operation 206, a connection between the data streaming device and a computing device is established. For example, computing device 110 uses SSID and security key to authenticate itself to data streaming device 102.

At operation 208, the data streaming device uses a browser of the computing device for server authentication of the data streaming device. For example, data streaming device 102 uses browser 114 of computing device 110 to obtain authentication information and transmit the authentication information to server 112, as well as determine whether authentication with server 112 was successful. The details of data streaming device 102 authentication are discussed in method 300.

At operation 210, the data streaming device is connected from the computing device. For example, upon successful authentication, WiFi access point module 116 disables NAT and data streaming device 102 becomes an end point device.

At operation 212, steaming content is retrieved and/or transmitted using the data streaming device. For example, data streaming device 102 receives streaming content 111 stored within global network 108. After operation 212, data streaming device 102 may repeat operation 202 at preconfigured time intervals to determine whether there is continuous access to global network 108 and whether another authentication to server 112 is required.

Figure 3:
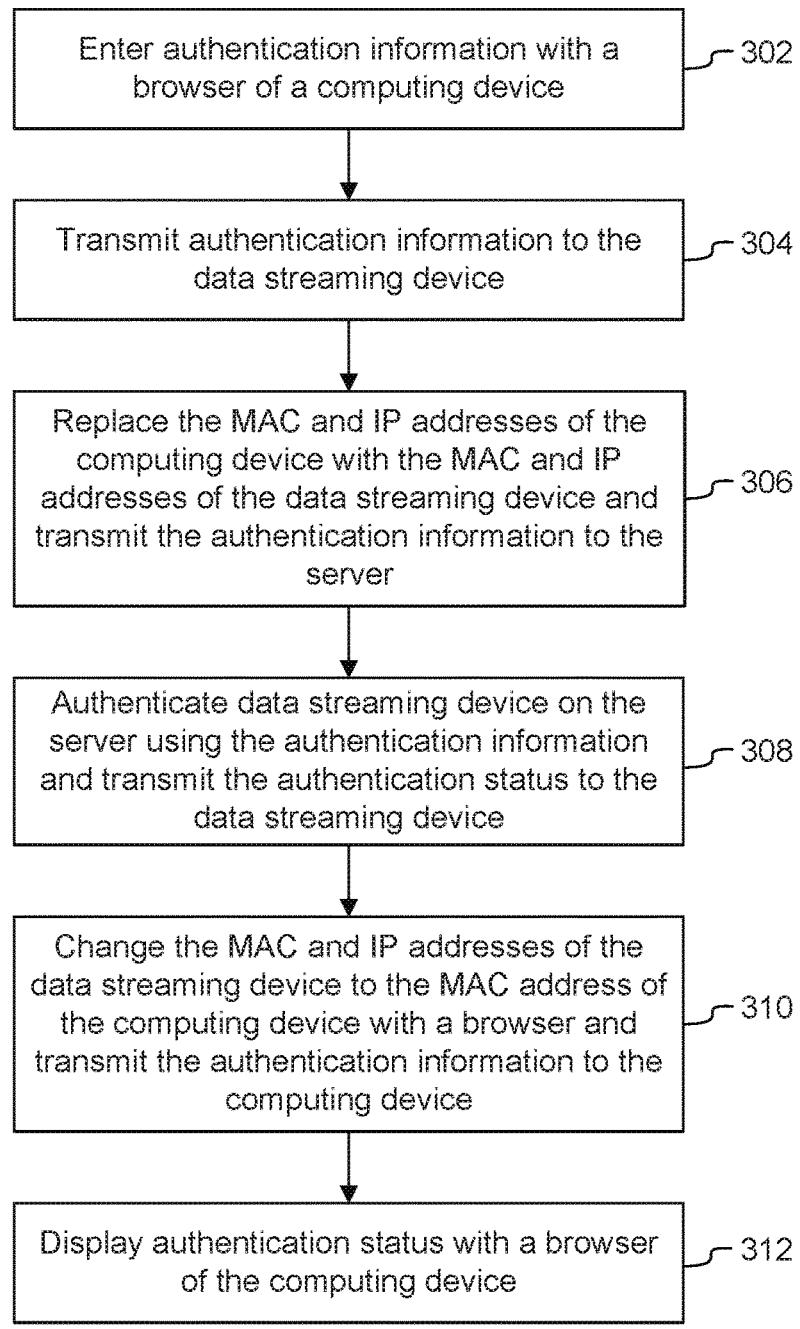
FIG. 3 is a flowchart of a method for authenticating a data streaming device to a server with a browser of another computing device, according to an embodiment.

FIG. 3 is a flowchart of a method 300 for authenticating a data streaming device to a server using a browser of another computing device, according to an embodiment.

At operation 302, authentication information is entered by a user on a browser. For example, browser 114 of computing device 110 connected to data streaming device 102 receives authentication information from a user. As discussed above, authentication information may include user credentials, payment information, and/or terms and conditions for accessing global network 108 via server 112.

At operation 304, the authentication information is transmitted to the data streaming device. For example, data streaming device 102 receives packets that include authentication information from browser 114 of computing device 110. In an embodiment, the received packets include the MAC address and IP address of computing device 110.

At operation 306, the authentication information is transmitted to a server. For example, when packets arrive from computing device 110, data streaming device 102 replaces MAC address and IP address of computing device 110 in the packets with MAC address and IP address of data streaming device 102, and transmits the packets to server 112.

In an embodiment, operations 304 and 306 represent how a packet travels from browser 114 to data streaming device 102 to server 112.

At operation 308, authentication information authenticates the data streaming device on the server and transmits the result of the authentication. For example, server 112 receives packets with authentication information and authenticates data streaming device 102. Once server 112 completes the authentication, server 112 transmits packets with the authentication status to data streaming device 102. In an embodiment, these packets include the MAC address and IP address of data streaming device 102.

At operation 310, the authentication status is transmitted to the computing device. For example, data streaming device 102 receives packets from server 112 and replaces the MAC address and IP address in the received packets with the MAC address and IP address of computing device 110. Data streaming device 102 then transmits the packets to computing device 110.

In an embodiment, operations 308 and 310 represent how a packet travels from server 112 to data streaming device 102 to computing device 110.

At operation 312, a browser of a computing device displays the authentication status. For example, computing device 110 receives packets from data streaming device 102 and uses browser 114 to display the authentication status included in the packets. If the authentication is successful, data streaming device 102 receives streaming content 111 from global network 108.

Figure 4:
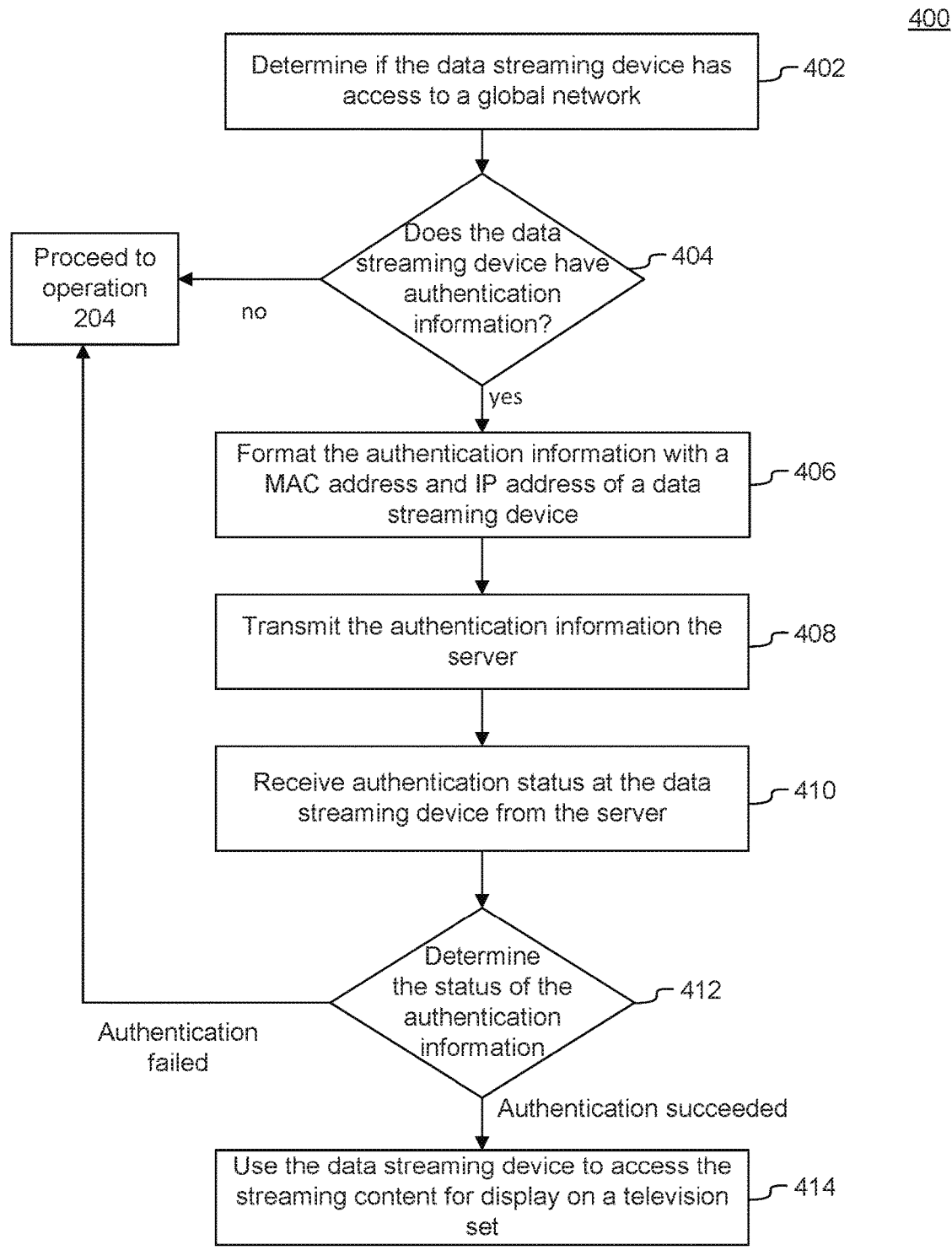
FIG. 4 is a flowchart of a method for authenticating a data streaming device to a server, according to an embodiment.

FIG. 4 is a flowchart of a method 400 for authenticating a data streaming device to a server, according to an embodiment. In an embodiment, data streaming device 102 may use method 400 for authentication when data streaming device 102 stores the authentication information in the memory storage included or coupled to data streaming device 102.

At operation 402, a determination is made whether data streaming device has access to a global network. For example, data streaming device 102 queries a default resource, such as a default web page, accessible using global network 108. If in response to the query, data streaming device 102 receives the resource with expected content, data streaming device 102 determines that it has access to global network 108 and the flowchart ends. If data streaming device 102 receives a response to a query with unexpected content or is rerouted to another URI, data streaming device 102 determines that there is no access to global network 108 and proceeds to operation 404.

At operation 404, a determination is made whether data streaming device has stored therein or access to the authentication information. For example, data streaming device 102 may query the memory storage included or coupled to data streaming device 102 (such as via a memory stick or card). If data streaming device 102 includes or otherwise has access to the authentication information, the flowchart proceeds to operation 406. Otherwise the flowchart moves to operation 204.

At operation 406, the data streaming device formats authentication information. For example, data streaming device 102 formats the authentication information into packets and attaches the MAC address and IP address of data streaming device 102 to the packets.

At operation 408, the data streaming device transmits the authentication information to a server. For example, data streaming device transmits the authentication information to server 112, where server 112 authenticates data streaming device 102 to local network 106.

At operation 410, the data streaming device receives a status of the authentication from a server. For example, server 112 transmits a message to data streaming device 102 that includes the status of authentication.

At operation 412, the data streaming device determines the authentication status. For example, if server 112 authenticates data streaming device 102 using the authentication information, the flowchart proceeds to operation 414. In a embodiment, data streaming device 104 may determine authentication status when authentication information is not encrypted and without forwarding the authentication information to computing device 110. When authentication information is encrypted, data streaming device 102 may forward the authentication information to computing device 110. If the server does not authenticate data streaming device 102, the flowchart proceeds to operation 204 where the data streaming device 102 obtains authentication information from computing device 110, and re-authenticates with server 112.

At operation 414, the data streaming device receives the streaming content. For example, data streaming device 102 receives streaming content 111 stored within global network 108.

Figure 5:
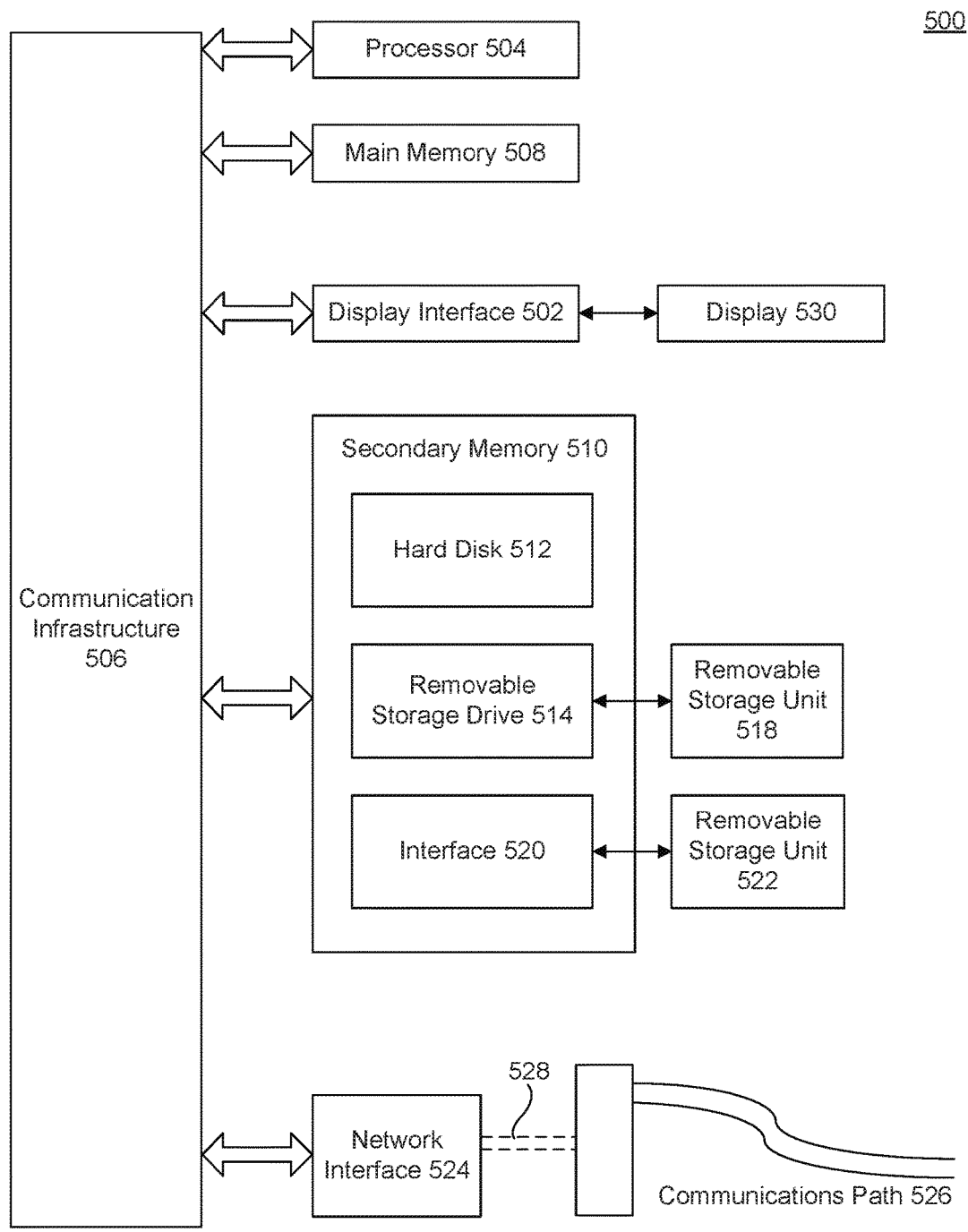
FIG. 5 is an exemplary computing device where the contemplated embodiments can be implemented.

Various embodiments can be implemented, for example, using one or more well-known computer systems or one or more components included in computer system 500 shown in FIG. 5. Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 530, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/or any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method comprising:
   receiving, from a computing device, a plurality of packets comprising authentication information for gaining access to a local network;
   determining that a header of the plurality of packets includes a media access control (MAC) address of the computing device;
   replacing the MAC address of the computing device with a MAC address of a data streaming device in the header;
   providing the authentication information comprising the MAC address of the data streaming device to a server; and
   receiving, from the server, an authentication for the data streaming device to access the local network.

2. The method of claim 1, wherein the authentication information is provided by the computing device to the data streaming device responsive to a request for the authentication information by the server.

3. The method of claim 2, wherein the computing device includes a browser configured to receive input related to the authentication information from a user responsive to the request for the authentication information by the server, and wherein the data streaming device does not a include a browser.

4. The method of claim 1, wherein the replacing comprises:
   replacing an internet protocol (IP) address of the computing device with an IP address of the data streaming device in the header.

5. The method of claim 1, wherein the receiving comprises:
   receiving a response from the server, responsive to the providing;
   providing the response to the computing device, wherein the computing device is configured to display the response on a browser, and wherein the response comprises the authentication from the data streaming device to access the local network.

6. The method of claim 5, wherein the providing the response comprises:
   replacing the MAC address of the data streaming device in a header of the received response with the MAC address of the computing device; and
   providing the response, including the MAC address of the computing device, to the computing device.

7. The method of claim 5, further comprising:
   receiving a second set of authentication information from the computing device, wherein the response indicated that the provided authentication information was invalid; and
   providing the second set of information to the server with the MAC address of the data streaming device.

8. The method of claim 1, further comprising:
   requesting, by the data streaming device, access to a default webpage, wherein the data streaming device stores expected content expected to be received in response to the request;
   receiving a response to the access quest;
   determining, based on a comparison of the received response and the expected content, whether the data streaming device has access to the local network.

9. The method of claim 8, wherein the determining is performed prior to the receiving the plurality of packets from the computing device, wherein the plurality of packets are received based upon a determination that the data streaming device does not have access to the local network.

10. A system, comprising:
    a non-transitory memory; and
    at least one processor coupled to the memory and configured to perform operations comprising:
      receiving, from a computing device, a plurality of packets comprising authentication information for gaining access to a local network;
      determining that a header of the plurality of packets includes a media access control (MAC) address of the computing device;
      replacing the MAC address of the computing device with a MAC address of a data streaming device in the header;
      providing the authentication information comprising the MAC address of the data streaming device to a server; and receiving, from the server, an authentication for the data streaming device to access the local network.

11. The system of claim 10, wherein the authentication information is provided by the computing device to the data streaming device responsive to a request for the authentication information by the server.

12. The system of claim 10, wherein the replacing comprises:
replacing an internet protocol (IP) address of the computing device with an IP address of the data streaming device in the header.

13. The system of claim 10, wherein the receiving comprises:
receiving a response from the server, responsive to the providing;
providing the response to the computing device, wherein the computing device is configured to display the response on a browser, and wherein the response comprises the authentication from the data streaming device to access the local network.

14. The system of claim 13, wherein the providing the response comprises:
replacing the MAC address of the data streaming device in a header of the received response with the MAC address of the computing device; and
providing the response, including the MAC address of the computing device, to the computing device.

15. The system of claim 13, wherein the operations further comprise:
receiving a second set of authentication information from the computing device, wherein the response indicated that the provided authentication information was invalid; and
providing the second set of information to the server with the MAC address of the data streaming device.

16. The system of claim 10, wherein the computing device includes a browser configured to receive authentication information from a user, and wherein the data streaming device does not a include a browser.

17. The system of claim 10, wherein the operations further comprise:
requesting, by the data streaming device, access to a default webpage, wherein the data streaming device stores expected content expected to be received in response to the request;
receiving a response to the access quest;
determining, based on a comparison of the received response and the expected content, whether the data streaming device has access to the local network.

18. The system of claim 17, wherein the determining is performed prior to the receiving the plurality of packets from the computing device, wherein the plurality of packets are received based upon a determination that the data streaming device does not have access to the local network.

19. A non-transitory computer-readable medium having instructions stored thereon that, when executed by at least one computing device, causes the at least one computing device to perform operations comprising:
receiving, from a second computing device, a plurality of packets comprising authentication information for gaining access to a local network;
determining that a header of the plurality of packets includes a media access control (MAC) address of the second computing device;
replacing the MAC address of the second computing device with a MAC address of a data streaming device in the header;
providing the authentication information comprising the MAC address of the data streaming device to a server; and
receiving, from the server, an authentication for the data streaming device to access the local network.

* * * * *